United States Patent [19]
Schad

[11] Patent Number: 5,288,451
[45] Date of Patent: Feb. 22, 1994

[54] PROCESS AND APPARATUS FOR DIRECT GATING INJECTION MOLDING

[75] Inventor: Robert D. Schad, Ontario, Canada

[73] Assignee: Husky Injection Molding Systems Ltd., Bolton, Canada

[21] Appl. No.: 420,308

[22] Filed: Oct. 12, 1989

Related U.S. Application Data

[63] Continuation-in-part of Ser. No. 221,026, Jul. 18, 1988, abandoned.

[51] Int. Cl.⁵ .............................................. B29C 45/27
[52] U.S. Cl. ...................... 264/328.8; 264/328.12; 264/328.15; 264/334; 264/335; 425/549; 425/556; 425/573; 425/577; 425/437; 425/438
[58] Field of Search .............. 264/328.8, 328.9, 328.12, 264/328.15, 328.16, 335, 334; 425/548, 549, 552, 554, 556, 570, 571, 573, 577, 437, 438

[56] References Cited

U.S. PATENT DOCUMENTS

| | | |
|---|---|---|
| 3,169,688 | 2/1965 | Schad . |
| 3,660,002 | 5/1972 | Morroni ............................. 425/437 |
| 4,381,275 | 4/1983 | Sorensen . |
| 4,508,676 | 4/1985 | Sorensen . |
| 4,540,543 | 9/1985 | Thomas et al. . |
| 4,622,002 | 11/1986 | Bormuth . |
| 4,721,452 | 1/1988 | Delfer, III ......................... 425/534 |
| 4,793,659 | 12/1988 | Oleff et al. ....................... 264/328.8 |
| 4,844,405 | 7/1989 | Sorensen . |

FOREIGN PATENT DOCUMENTS

| | | |
|---|---|---|
| 1130155 | 5/1962 | Fed. Rep. of Germany ... 264/328.8 |
| 1000241 | 10/1951 | France ................................. 425/577 |
| 2072569 | 10/1981 | United Kingdom ............. 264/328.8 |

*Primary Examiner*—Jill L. Heitbrink
*Attorney, Agent, or Firm*—Bachman & LaPointe

[57] ABSTRACT

The present invention relates to a process and apparatus for injection molding thin-walled plastic articles. The apparatus includes a mold cavity and a mold core defining a cavity space in the shape of the article. The cavity space has a circumferentially extending region having a thickness greater than the thickness of a sidewall defining portion. This circumferentially extending region is preferably located at the approximate mid-point of the sidewall defining portion. At least two gates directly and simultaneously introduce plastic material initially into the circumferentially extending portion in a manner so as to minimize the creation of side loads and core shift. After the circumferentially extending region is filled, the plastic material fills the entire cavity space. The plastic material is thereafter cooled to form the desired article.

22 Claims, 3 Drawing Sheets

PROCESS AND APPARATUS FOR DIRECT GATING INJECTION MOLDING

CROSS-REFERENCE TO RELATED APPLICATION(s)

This application is a continuation-in-part of U.S. patent application Ser. No. 221,026, DIRECT GATING INTO THE LIP OF A THIN WALLED CONTAINER, by Robert D. Schad, filed Jul. 18, 1988 now abandoned.

BACKGROUND OF THE INVENTION

The present invention relates to a process and apparatus for injection molding thin walled articles such as hollow containers.

Molded articles such as thin walled containers have traditionally been produced by injection molding, usually with a hot runner mold directly gated into the bottom of the container. Limitations on molding cycle and minimizing the sidewall thickness are often imposed by the thickness and configuration of the article's lip. In some container styles the lip is considerably thicker than the side wall, typically a lip 0.30-0.040" compared to a sidewall thickness of 0.015-0.020". It becomes increasingly difficult to properly pack the lip and to eliminate sink marks, when the resin must be forced through the restriction of a very thin sidewall from a gate at the bottom of the part. Generally, the resin must be raised higher in temperature to promote flow through the thin sections. The consequences of doing this are that the molding cycle is slowed by the time taken to cool the thickest part of the container—the lip.

One approach which has been found to overcome many of the molding problems associated with molding thick lip/thin sidewall articles is injection blow molding. U.S. Pat. No. 4,540,543 to Thomas illustrates a typical blow molding system for forming thin walled containers. There are however several problems which remain.

Injection blow molding requires specialized molds and expensive support equipment. Further there is the problem of the tendency to create a mold separation force when injecting the resin into the bottom of the part. This occurs because the top of the mold core acts as a post. As the resin flows under pressure against the top of the mold core, the mold core is pushed away from the mold cavity. The mold separation force thus created can be quite large because the relative cross section mold area at the bottom of the part is relatively large.

Another approach which has been used to form thin walled articles is sequential injection molding. In this approach, a first plastic material is injected into a cavity through a first gate. This material is then cooled to solidify the first plastic. Subsequent to injecting the first plastic, a second plastic material is injected through a second gate into the cavity. The second plastic fills the cavity and fuses with the previously injected plastic. Thereafter, the second plastic is cooled to solidify the fused unit. U.S. Pat. Nos. 4,381,275 and 4,508,676, both to Sorenson, illustrate this approach.

The purpose of sequential injection is to have the cooled first plastic material stabilize the core section by impeding movement of the core section caused by injection of the second plastic material. This approach however has not been entirely successful in eliminating the side load problem. Additionally, it does lead to the formation of weak weld lines where the first and second plastic materials are fused. Weld lines are typically at their strongest when both melt edges are at the same high temperature.

Another method for forming molded articles having comparatively thick lip portions is shown in U.S. Pat. No. 4,622,002 to Bormuth. A split cavity mold is shown with an edge gating system feeding directly into the lip of the part. The primary disadvantage of this arrangement is that the alignment of the cavity halves with the core will not adequately resist the considerable side load induced by the injection of the resin at the lip. This side force will cause the mold core to shift out of axial alignment with the mold cavity before the resin has filled the cavity. This in turn will result in a part having an unequal sidewall thickness. A second disadvantage is that the mold must contain complicated mechanisms to synchronize the opening and closing of the cavity halves during the cycle and the runner system must be arranged so the runner axis is perpendicular to the core, and the axis of the machine. This entails additional complexity and expense. A third disadvantage is the formation of gate vestiges on the outer perimeter of the lip.

Parent application Ser. No. 221,026 describes a molding approach which overcomes these problems. In this approach, the plastic material is directly gated into the lip of the thin wall article without sacrificing core/cavity alignment and conventional mold motions along the machine axis. By filling the comparatively thick lip or rim portion first and then having the plastic material flow through the sidewall portions, substantially equal forces act against the sides of the core and the cavity.

While this direct gating approach has been quite useful, there is still room for improvement. Molding approaches which reduce the pressures acting in the space defined by the core/cavity arrangement, which operate at faster speeds, and which can be used to form very thin parts are always being sought.

Accordingly, it is an object of the present invention to provide an injection molding process and apparatus for forming thin walled articles.

It is a further object of the present invention to provide a process and apparatus as above which allows articles to be formed with less pressure.

It is yet a further object of the present invention to provide a process and apparatus as above which allows articles to be formed in a faster time.

It is still another object of the present invention to provide a process and apparatus as above which does not create any significant side loads so as to cause misalignment of the mold cavity/core portions.

These and other objects and advantages will become more apparent from the following description and drawings wherein like reference numerals depict like elements.

SUMMARY OF THE INVENTION

It has been found that the foregoing objects and advantages are obtained by the process and apparatus of the present invention. The apparatus comprises an injection molding machine having a first mold portion defining a female cavity portion, a second mold portion defining a male core portion and means for moving the mold portions between a mold open position and a mold closed position. In the mold closed position, the mold core portion is substantially centered within the mold cavity portion and defines with the mold cavity portion a space in the shape of the article being molded. The space has a sidewall defining portion and a circumferentially extending region of greater thickness located along an intermediate portion of the sidewall defining portion. The machine further includes means for introducing molten plastic material into the space in the vicinity of the circumferentially extending region without creating any significant side loads and without disturbing the mold core/cavity alignment.

In a preferred embodiment, the circumferentially extending region is located approximately at the middle of the sidewall defining portion. The localized thickness increase in this region encourages the plastic material to racetrack around the circumference of the article before extending toward its extremities, thus promoting equal filling of the sides. It has been found that this approach is advantageous over rim gating at the lip approaches in that the effective flow length of the plastic material is halved. Consequently, thinner walled articles can be more efficiently produced. Further, the space can be filled with plastic material at a reduced pressure and/or in a faster time than if a rim gating approach was used. Yet another advantage of this approach is that the core construction can be simplified.

The plastic material introduction means may be two, three, or more gates spaced about the circumferentially extending region. Preferably, the gates are spaced equally around the region so as to minimize the production of side forces.

The process of the present invention broadly comprises providing an injection molding machine having a first mold portion defining a female cavity portion and a second mold portion defining a male core portion with the male core portion being substantially centered within the female cavity portion and defining with the female cavity portion a space in the shape of the article being molded. The space has a sidewall defining portion and a circumferentially extending region of greater thickness positioned intermediate ends of the sidewall defining portion. The process further comprises introducing molten plastic material into the space in the vicinity of the circumferentially extending region without creating any significant side loads and without disturbing the mold core/cavity alignment. In a preferred embodiment, the molten plastic material is simultaneously and continuously introduced into the region at at least two spaced apart portions.

Further details of the process and apparatus of the present invention will become clearer from the following description.

DETAILED DESCRIPTION OF PREFERRED EMBODIMENT(s)

Figure 1:
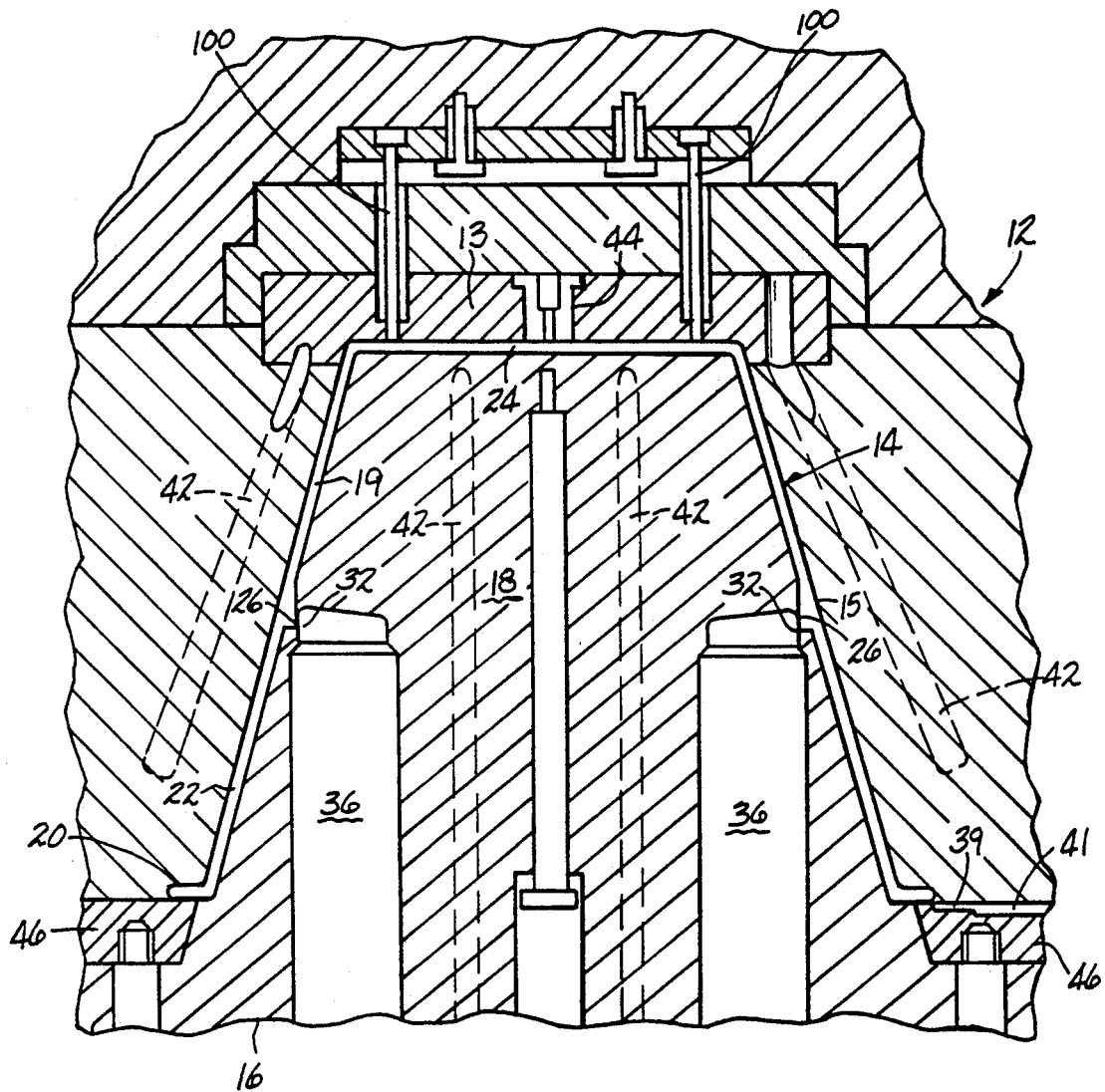
FIG. 1 illustrates in partial cross section a core/cavity stack arrangement having two hot top gates located within the mold core in accordance with the present invention.

Referring now to FIG. 1, the injection molding apparatus of the present invention comprises a mold stack including mold halves 12 and 16. The first mold half 12 comprises a female mold cavity 14 defined by a plurality of walls 15 and a pad 13. The second mold half 16 comprises a male mold core 18. Suitable means not shown are provided for moving the mold halves 12 and 16 between mold open and mold closed positions. For example, the mold half 12 may be secured to a fixed platen not shown while the mold half 16 may be secured to a movable platen not shown. The stack as shown in FIG. 1 is in a mold closed position. The stack assembly may further include a lock ring and tapers not shown for mechanically aligning the mold halves along the axis A—A. Alignment of the mold halves is important from the standpoint of producing a molded article having sidewalls with a substantially uniform thickness.

In the mold closed position, the mold core 18 is substantially centered within the mold cavity 14 and defines with the mold cavity a space 19 in the shape of the article or part to be formed. As can be seen from FIG. 1, the space 19 has a lip defining portion 20, a sidewall defining portion 22, a bottom defining portion 24 and a localized region 26 having a thickness greater than the thickness of the sidewall portion. In a preferred embodiment of the present invention, the localized region 26 extends circumferentially about the space 19 and is located at the approximate mid-point of the sidewall portion 22.

Molten plastic is directly gated into the region 26 using gates 32. The molten plastic is introduced into the region 26 and the space 19 through each gate 32 simultaneously. The molten plastic continues to flow through all gates 32 until the space 19 is filled.

While two gates are illustrated, it should be recognized that more than two gates can be used if desired. The spacing of the gates depends on the number used. Preferably the gates are spaced equally about the region 26 so as to minimize the production of unwanted side loads. Thus, the gates 32 shown in FIG. 1 are spaced approximately 180° apart. Each gate 32 communicates with a hot runner nozzle 36 through which molten plastic material is supplied.

It has been found that molten plastic introduced into the region 26 racetracks around the region 26 and rapidly fills it. After the region 26 is filled, the plastic material flows outwardly and evenly to the ends of the space 19 defining the lip portion 20 and bottom portion 24. The advantages to this approach include the following. Thinner articles or parts can be formed than with rim gating at the lip because the effective flow length of the resin is halved. Additionally, the space 19 can be filled using less pressure and/or faster because the plastic material travels a shorter distance. Still further, all weld lines generated during molding are at their optimum strength because the plastic material is simultaneously and continuously injected by all gates and all of the plastic is at substantially the same high temperature. Another advantage gained by the approach of the present invention is minimization of core shift by the rapid filling of the region 26 before the filling of the thinner sidewall defining portions 22.

As the plastic advances toward the extremities of the space 19, air may become trapped in the cavity space. Suitable air vents, such as vent 44 in the pad 13, may be provided to permit such air to escape. Air in the lip portion 20 may be vented in a conventional manner along the parting line between the mold halves using a vent 39 and a vent groove 41.

As previously discussed, one of the primary advantages attendant to the apparatus of FIG. 1 as well as the other apparatus embodiments is the ability to introduce the plastic material into the cavity space with substantially no side loads. This is because the plastic material flows into and fills the region 26 first before flowing into the sidewalls in a balanced fashion. As a result, the mold core 18 remains substantially centered within the mold cavity 14. Since the mold core and cavity substantially maintain their alignment throughout molding, articles or parts thus produced have sidewalls with a substantially uniform thickness. Yet another advantage is the substantial absence of forces tending to cause mold opening.

After the plastic material has substantially completely filled the cavity space 19, solidification occurs through cooling of the mold halves. Any suitable means known in the art may be used to cool the mold halves 12 and 16. Preferably, cooling is accomplished by flowing a suitable coolant fluid through cooling channels 42. Since the region 26 is the thickest part of the article and is closest to the gate and therefore the hottest, particular attention is given to providing efficient cooling in the region by placing the cooling channels in as close proximity thereto as possible.

Once the article has solidified on the mold core 18, the mold halves are moved into a mold open position. The article may be ejected in the following manner. One or more vents 44 may be provided in the pad 13. The vent(s) 44 may be connected to both a vacuum and an air source not shown. As the core 18 moves toward the mold open position, a vacuum may be pulled through the vent(s) 44 to hold the part in position against the mold cavity. If desired, air may be blown through fixed vents 43 on the core to assist in maintaining the article in position. Stripper rings 46 may be provided to assist in removing the article from the mold core 18. The stripper rings 46 may surround the core and may be moved relative thereto in a well known manner to move the article off the core.

When the core 18 reaches the full mold open position, the vacuum may be stopped and air may be caused to flow through the vent(s) 44. The air flow through the vent(s) 44 operates to blow the article out of the mold cavity. To assist in ejecting the article, one or more moving vents or vent pins 100 communicating with the air source not shown may be provided. When the mold has fully opened, the cavity plate may be advanced causing the vent pin(s) 100 to be opened to allow a large volume of air to be supplied to the base of the article pushing it out of the cavity. Obviously, the negative air pressure is turned off or reversed at this time.

If desired, the vents 43 and 44 and vent pins may be omitted. In such an instance, ejection of the molded article is achieved solely through the use of stripper rings 46.

In operation, the mold halves 12 and 16 are moved to a mold closed position. Molten plastic is then introduced into the region 26 by gates 32. The plastic is introduced through all of the gates simultaneously and continuously until the entire space 19 is substantially filled. Thereafter, the plastic material is cooled and solidified. After solidification has been completed, the mold halves are opened and the fabricated article or part is ejected. It has been found that the system of FIG. 1 may be used to make 3- or 5-gallon containers.

Figure 2:
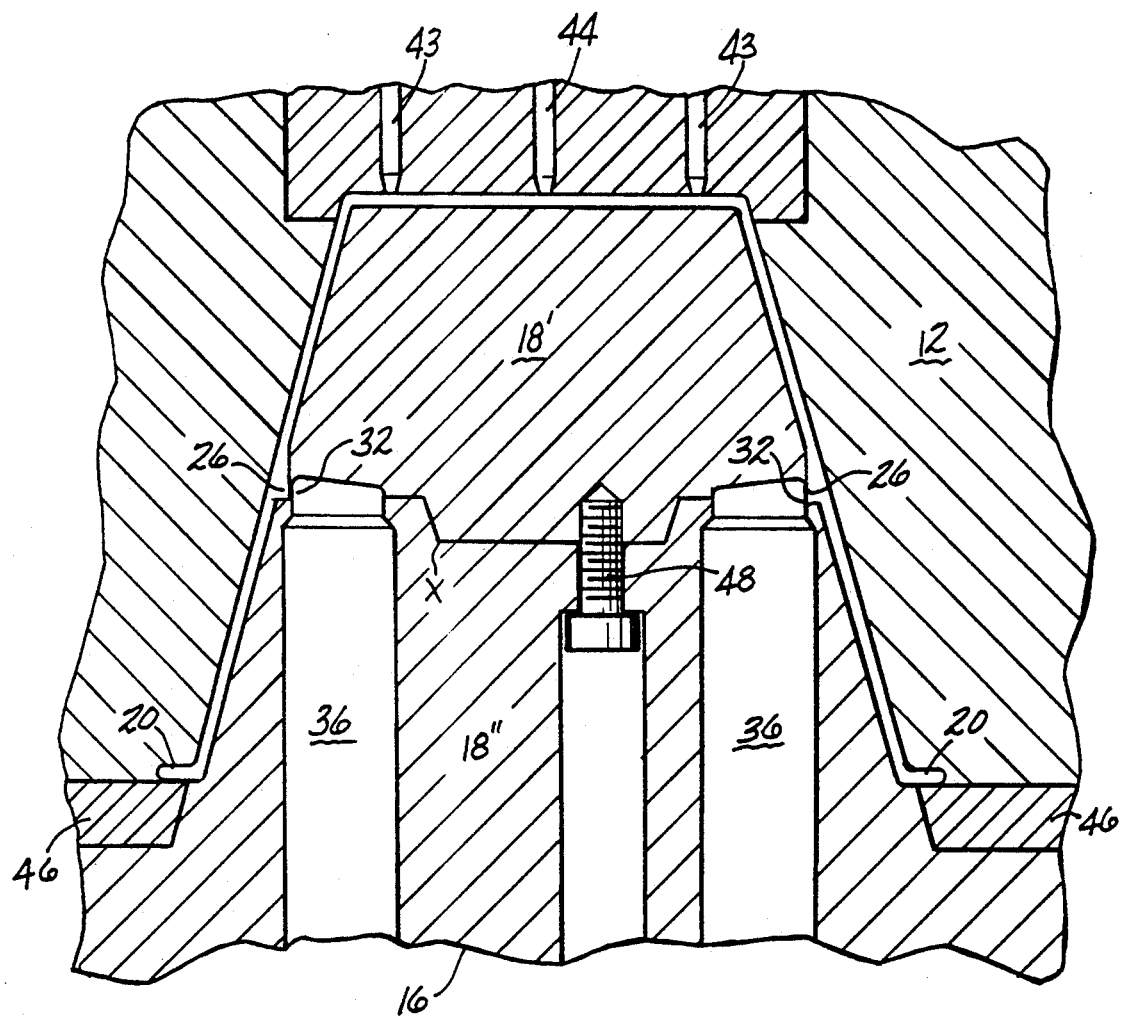
FIG. 2 illustrates an alternative core/cavity stack wherein the core has two parts.

If desired, the mold core half may be formed in two pieces 18 and 18' as shown in FIG. 2. This greatly simplifies core construction and allows the gates 32 to be machined with great accuracy and simplicity into at least one of the prices as they are made in the two core halves separately. Suitable means such as bolts 48 may be provided to join the core pieces 18 and 18' together. The taper X insures proper alignment between the pieces 18 and 18'.

Figure 3:
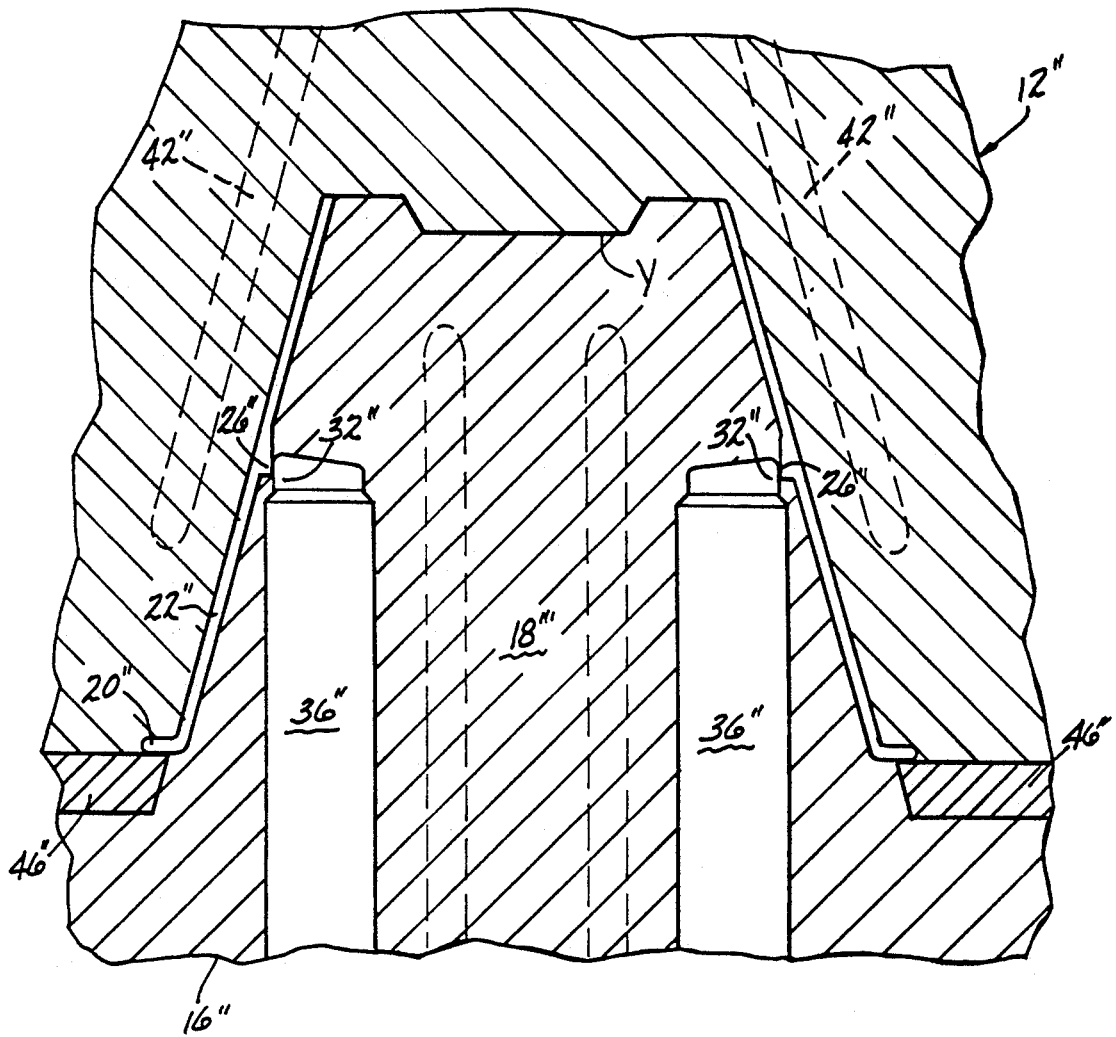
FIG. 3 is yet another core/cavity stack arrangement for forming a thin walled article open at its top and bottom.
Figure 4:
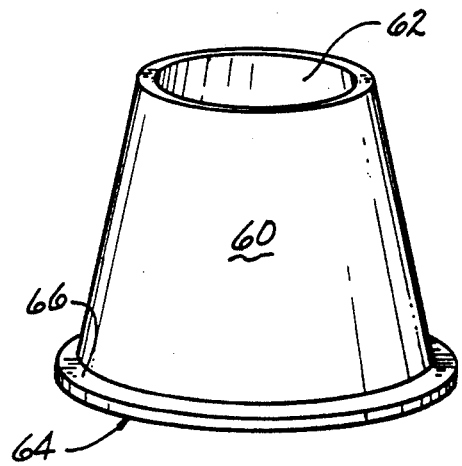
FIG. 4 is an illustration of an article formed by the embodiment of FIG. 3.

FIG. 3 illustrates an alternative stack arrangement for forming an article or part 60 which is open at its top end 62 and bottom end 64 and which has a lip portion 66. As shown in FIG. 3, the arrangement includes a first half 16" with a mold core 18" and second mold half 12" with a cavity portion 14". The mold core 18" and the mold cavity 14' are aligned to each other using the taper Y. As before, two gates 32" are provided to introduce plastic material into the cavity 19". Suitable means such as channels 42" are provided to cool the plastic material. As before, stripper rings 46" may be provided to eject the solidified part from the mold core.

While internal gating is preferred, it is possible to design the mold cavity half to accommodate external gating. In such a system, the space 19 may be redesigned so that region 26 extends circumferentially around an external portion of said space. Alternatively, the space 19 may remain as shown in FIG. 1 and external gates may be positioned adjacent the outer edge of the thickened region. This alternative is useful where the molded article is to have a smooth outer surface.

Articles formed using the apparatus and process of the present invention may be used as heat sealable food containers, vending cups, beverage tumblers and the like.

As can be seen from the foregoing discussion, the direct gating approach illustrated herein improves the core shift characteristics of the mold. The gates initially fills the comparatively thick region 26 before the plastic material flows along the sidewall portions. Thereafter, the plastic material flows substantially equally along the sidewalls causing substantially equal forces to be applied to the core and the cavity. As a result, the core remains substantially centered within the mold cavity. The substantial absence of any core shift in turn results in a molded article having sidewalls with substantially equal thicknesses. The gating approaches used herein also significantly reduce those forces tending to cause the mold to open.

It is apparent that there has been provided in accordance with this invention, a process and apparatus for direct gating injection molding which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for injection molding a hollow article which comprises the steps of:

providing an injection molding machine having a first mold portion defining a female cavity portion and a second mold portion defining a male core portion which is shiftable relative to said cavity portion when said mold portions are in a mold closed position, said male core portion being substantially centered within said female cavity portion when said mold portions are in said mold closed position and defining a space in the shape of said article with said female cavity portion, said space having a sidewall defining portion, an upper end, a bottom end and a circumferentially extending region of greater thickness positioned at an approximate center point of said sidewall defining portion; and introducing molten plastic material into said space in the vicinity of said circumferentially extending region without creating any significant side loads which would cause said male core portion to shift relative to said female cavity portion, whereby said mold core portion remains substantially centered within said mold cavity portion.

2. The process of claim 1 wherein said introducing step comprises simultaneously and continuously introducing said molten plastic material into said region at at least two portions of said circumferentially extending region.

3. The process of claim 2 wherein said introducing step comprises:

providing a gate communicating with a hot runner nozzle at each of said at least two portions; and injecting molten plastic material through said gates so that said circumferentially extending region fills before said portions of said space defining said sidewalls for said article so as to minimize shifting between said mold core portion and said mold cavity portion.

4. The process of claim 3 further comprising:

cooling said molten plastic after said space has been completely filled with said molten plastic.

5. The process of claim 4 further comprising ejecting said article from said machine after said cooling step has been completed.

6. The process of claim 5 wherein said ejecting step comprising:

providing at least one vent communications with both a vacuum source and an air source and at least one vent pin communicating with said air source;

maintaining said article in position against the mold cavity by applying a vacuum through said at least one vent as said mold core moves toward a mold open position; and blowing air through said at least one vent and said at least one vent pin to eject said article from said mold core.

7. The process of claim 5 wherein said ejecting step comprising:

providing a stripper ring substantially surrounding said mold core portion; and moving said stripper ring relative to said mold core portion to eject said article from said mold core.

8. The process of claim 1 wherein said introducing step comprises:

filling said circumferentially extending region with said plastic material and then flowing said plastic material outwardly into said sidewall defining portion so that it flows substantially evenly towards said ends, whereby said space can be filled faster and with less pressure thereby facilitating the formation of thinner articles as a result of the plastic material travelling a shorter distance.

9. An apparatus for injection molding a hollow plastic article having at least two sidewalls, said apparatus comprising:

an injection molding machine having a first mold portion defining a female cavity portion and a second mold portion defining a male core portion which is shiftable relative to said cavity portion, said mold portions being movable between a mold open position and a mold closed position;

said mold core portion being substantially centered within said mold cavity portion when said mold portions are in said mold closed position and defining with said mold cavity portion a space in the shape of said article;

said space having a sidewall defining portion and a circumferentially extending region of greater thickness located at an approximate center point of said sidewall defining portions; and means for introducing molten plastic material into said space in the vicinity of said circumferentially extending region without creating any significant side load which would cause said male core portion to shift relative to said female cavity portion, whereby said mold core portion remains substantially centered within said mold cavity portion.

10. The apparatus of claim 9 wherein said introducing means comprises means for simultaneously and continuously introducing said molten plastic material into said space at two opposed portions of said circumferentially extending region.

11. The apparatus of claim 9 wherein said introducing means comprises at least two gates positioned adjacent portions of said circumferentially extending region and equispaced from each other.

12. The apparatus of claim 11 wherein said gate is positioned adjacent an interior side of said space.

13. The apparatus of claim 11 wherein each said gate is positioned adjacent an exterior side of said space.

14. The apparatus of claim 11 wherein each gate communicates with a hot runner nozzle.

15. The apparatus of claim 11 wherein said gates substantially fill said circumferentially extending region with molten plastic material before filling remaining portions of said space so as to minimize shifting between said mold core and said mold cavity.

16. The apparatus of claim 11 wherein said male core portion comprises two pieces and said gates are machined in at least one of said pieces.

17. The apparatus of claim 9 wherein said circumferentially extending region lies at the middle of said sidewall defining portion.

18. The apparatus of claim 9 further comprising:

means for cooling said molten plastic in said space after said space has been completely filled with said molten plastic so as to form improved weld portions.

19. The apparatus of claim 1 further comprising:

means for ejecting said article from said machine.

20. The apparatus of claim 19 wherein said ejecting means comprises a stripper ring surrounding said mold core portion.

21. The apparatus of claim 19 wherein said ejecting means comprises:

at least one vent communicating with both a vacuum source and an air source; and said article being held within said mold cavity portion by the application of negative pressure through said at least one vent by said vacuum source as said mold core portion moves toward said mold open position and said article being ejected from said mold cavity portion by blowing air from said air source through said at least one vent when said mold core portion reaches said mold open position.

22. The apparatus of claim 9 wherein:
said cavity space has an upper end and an opposed bottom end; and
said plastic material introduced into said circumferentially extending region fills said region and then flows outwardly and substantially evenly to said ends,
whereby said space can be filled using less pressure and faster thereby allowing the formation of thinner articles because said plastic material travels a shorter distance.

* * * * *